3,756,837
Patented Sept. 4, 1973

3,756,837
COATING COMPOSITIONS USING LIQUID
DRYING VEHICLES
Kenneth E. Weber, Granada Hills, John L. Wanamaker, Burbank, and Geraldine M. Hoch, Chatsworth, Calif., assignors to Lockheed Aircraft Corporation, Burbank, Calif.
No Drawing. Continuation-in-part of application Ser. No. 28,009, Apr. 30, 1970. This application Apr. 4, 1972, Ser. No. 240,995
Int. Cl. C09d 5/08
U.S. Cl. 106—14
12 Claims

ABSTRACT OF THE DISCLOSURE

Coating compositions for use in inhibiting galvanic corrosion can be created utilizing a cobalt chromate compound or mixture as drying agents for a liquid drying vehicle or mixture and to inhibit galvanic corrosion. Such a liquid drying vehicle may be a natural drying or semi-drying oil or a reaction product of such an oil or a fatty acid within such an oil with a synthetic resin such as an alkyd or an epoxy resin.

CROSS-REFERENCE TO RELATED APPLICATIONS

This application is a continuation-in-part of the abandoned co-pending application Ser. No. 28,009, filed Apr. 30, 1970 by Kenneth E. Weber et al.

This application contains subject matter which is related to that set forth in the U.S. patent application Ser. No. 24,024 filed Mar. 30, 1970 by Kenneth E. Weber et al. entitled, "Production of Dicobaltous Oxychromate and Percobaltous Oxychromate" which has issued on May 23, 1972, as U.S. Pat. No. 3,664,808.

This application also contains subject matter which is related to that set forth in the abandoned U.S. patent application Ser. No. 28,008, filed Apr. 13, 1970 by Kenneth E. Weber et al. entitled, "Use of Cobalt Chromates in Inhibiting Corrosion."

BACKGROUND OF THE INVENTION

Galvanic corrosion is a matter of extreme economic importance. Such corrosion takes many forms in different environments. The present invention is primarily concerned with galvanic corrosion such as occurs by galvanic coupling between two dissimilar metals such as aluminum and iron or between aluminum and titanium. This type of corrosion is of particular significance in certain fields such as in the field of aircraft manufacture.

In the past a great deal of work has been devoted to minimizing or stopping such galvanic corrosion. In effect the prior efforts in this regard have not been completely successful. This is clearly evidenced by the continuing research towards providing new and more effective ways of preventing corrosion resulting from galvanic coupling. It is considered that an understanding of the present invention does not require a detailed understanding of all that has been done in this field.

It has been found that certain compounds such as zinc chromate, magnesium chromate and the like are relatively effective in minimizing corrosion resulting from galvanic coupling. In the past such compounds have been used in coatings where corrosion is apt to occur in essentially a carrier-type vehicle or phase. Thus, for example, compounds of this type have been disposed in a paint type composition essentially as a filler or pigment. They have aso been compounded within various polymer compositions in the same general manner in which agents such as carbon black, zinc oxide and the like are compounded so as to be carried by or suspended within polymer compositions.

In these uses these galvanic corrosion inhibitors serve primarily one function—their intended function of providing corrosion protection when these compositions are applied or used in an area where corrosion due to galvanic coupling is apt to occur. In such utilization these galvanic corrosion inhibitors have been effective in inhibiting such corrosion as a consequence of their being physically present in the area or region where such corrosion is anticipated or where such corrosion might be reasonably anticipated. These inhibitors have been effective in inhibiting such corrosion through chemical mechanisms which are unimportant to an understanding of the present invention.

In the utilization of inhibitors as indicated in the preceding discussion the carrier-type vehicles or phases used with these inhibitors have been employed essentially as binders or holding agents to physically locate these corrosion inhibitors in locations where their physical presence would make them useful in inhibiting corrosion. In such binders these galvanic corrosion inhibitors have not been utilized to accomplish any secondary actions unrelated to corrosion inhibition. Thus, for example, when inhibitors have been used in the past in paint-type compositions employing a drying oil or a related carrier of a resinous character these compositions have had to be formulated so as to be complete in themselves by using a separate dryer without the corrosion inhibitors serving any secondary functions relative to the use of the binder or carrier compositions employed.

BRIEF SUMMARY OF THE INVENTION

The present invention is intended to provide new and improved coating compositions for use in providing corrosion protection which do not require the use of separate corrosion inhibitor compounds and separate dryers as in prior compositions such as have been briefly indicated in the preceding discussion. An objective of this invention is to provide coating compositions for the purpose indicated in which the same compound or compounds are utilized both to provide corrosion protection in a final protective coating and to provide the necessary action of the dryer in the composition. In a composition of this invention the dryer used is also a corrosion inhibitor.

Further objectives of this invention are to provide coating compositions of the type indicated which may be easily formulated utilizing different liquid ingredients capable of drying in air to form a film through the use of routine formulary skill in the coating industry and which can be easily and conveniently manufactured using established techniques and equipment. Another objective of this invention is to provide coating compositions of the type indicated which preferably use semi-drying oils as fluid carriers. The significance of this will be recognized. Such oils are commonly available at a comparatively nominal cost. Because of their properties in the past they have been used only sparingly in coating compositions such as paints.

In accordance with this invention these objectives are achieved by formulating a coating composition in which a liquid ingredient or mixture capable of drying so as to form a film carries an effective amount of cobalt chromate compound or a mixture of cobalt chromate compounds to serve as a dryer for the composition and to serve as a corrosion inhibitor in a coating created from this composition. Such a composition may, also, contain various other ingredients such as are commonly used in paints or related coating compositions.

Preferably the liquid ingredients utilized is a semi-drying oil or a mixture of semi-drying oils and the cobalt chromate used is dicobaltous oxychromate or a percobaltous oxychromate composition having the formula $x\text{CoO} \cdot \text{CrO}_3$ in which $x$ is greater than 2 or a mixture of these. Other cobalt chromates may be employed with the same or other drying oils. If desired, a lesser amount of a cobalt chromate than will provide effective corrosion protection in a coating may be utilized in a coating composition as herein described so that such a compound only acts as a dryer in such a composition.

DETAILED DESCRIPTION

Most coating compositions such as paints are mixtures of at least one drying oil or liquid drying vehicle, one or more dryers, one or more resins, usually one or more plasticizers, usually one or more thinners and usually minor amounts of one or more secondary ingredients. This term "drying oil" is utilized in the protective coating industry in various ways and is occasionally defined in different manners. Most commonly the term "drying oil" is used in the broad sense to define oily organic liquids which, when applied in a thin film, will readily absorb oxygen from the air and "dry" to form a relatively tough, elastic solid substance.

Usually such drying oils are natural oils such as oiticica, tung, linseed and perilla and the like having a high unsaturated fatty acid content or equivalent of the same prepared from naturally occurring non-drying oils and having an iodine value in excess of about 135. The term "drying oil" is also broadly used in the industry to designate "combinations" of such natural oils or their fatty acids with various synthetic resins such as alkyd resins and epoxy resins which absorb oxygen and harden in the same general manner as naturally occurring drying oils. Such "combination" compositions are considered to be classified as drying oils if they also have iodine values in excess of about 135.

The term "drying oil" as used in the protective coating industry is to be contrasted with the closely related term "semi-drying oil." As used herein, this term "semi-drying" oil is utilized to designate oily organic liquids which, when applied as a thin film do not readily absorb oxygen from the air so as to dry to the form of a relatively tough, elastic substance, but which will absorb such oxygen comparatively slowly so as to gradually dry to such a substance. Such semi-drying oils are classified as such liquid having iodine values of no greater than about 135.

Usually such semi-drying oils are natural oils such as cotton seed, corn, soy bean and other like oils. It is possible to prepare them from naturally occurring non-drying oils. The term semi-drying oils is also broadly utilized to designate combinations of these natural oils or their fatty acids with various synthetic resins such as alkyd and epoxy resins which will absorb oxygen in the same general type of manner as naturally occuring semi-drying oils so as to slowly tend to form a hard, elastic composition.

It will be recognized that these terms "drying oils" and "semi-drying oils" are occasionally employed in the industry in a rather loose sense. On occasion oils which are classified as semi-drying oils in this specification may be referred to as drying oils. Similarly oils which are classified herein as drying oils are occasionally referred to as semi-drying oils. To avoid confusion in this specification the term "liquid drying vehicle" is employed herein to designate both natural and synthetic drying and semi-drying oils which take up or absorb oxygen from the air so as to form or tend to form a relatively tough, elastic, solid substance by a "drying" action.

So-called dryers are utilized in coating compositions as are indicated in the preceding discussion in order to promote this absorption of oxygen so that the liquid drying vehicle or vehicles used in them will set up or form the type of a substance indicated in the preceding discussion within a reasonably short period after the application of a coating composition as indicated so that it is exposed to the air. A number of such dryers have been utilized. Most frequently such dryers have been cobalt compounds.

An understanding of the present invention is not considered to require a detailed discussion of plasticizers such as are frequently employed in different coating compositions. Normally these plasticizers are organic compounds which will not dry out or harden in air which are employed so as to modify the physical properties of a substance obtained by the "drying" of a liquid drying vehicle as a consequence of being present within such substance. The thinners utilized in these coating compositions are normally liquid solvents merely employed for viscosity controlling purposes.

These coating compositions normally include various pigments used so as to color them. Frequently these pigments are utilized to fill or extend the compositions so as to limit the amount of the liquid drying vehicle required in them. These coating compositions may also contain various comparatively minor quantities of other secondary type ingredients for various different purposes.

Different manufacturers utilize ingredients as are indicated in different manners and in different proportions, so as to create different compositions for different purposes. Different coating manufacturers also employ various different techniques of creating coating compositions. This field of coating manufacture is one in which trade secrets as to precise ingredients and as to precise manufacturing steps are closely guarded. The proportions of various different types of ingredients as indicated in different compositions can be varied over extremely wide limits depending upon the specific ingredients used and the manner in which these ingredients are compounded.

For these reasons it is difficult to define the present invention in a precise numerical manner. The invention itself involves the discovery that a cobalt chromate compound useful as a corrosion inhibitor can be utilized as an effective dryer for the liquid ingredient or ingredients in a coating composition capable of drying in air to form a film. The amount of such a cobalt compound to be used in a coating composition so as to obtain the effective action of a dryer will vary depending upon the reactivity of the liquid ingredient or ingredients capable of drying used and depending upon the reactivity of the particular cobalt compound or cobalt compounds used.

The cobalt chromates capable of being used with the present invention are cobaltous chromate ($CoCrO_4$), dicobaltous oxychromate ($2CoO.CrO_3$), and percobaltous oxychromates having the formula $xCoO.CrO_3$ in which $x$ is greater than 2. The dicobaltous and percobaltous oxychromates and mixtures of them may be formed in the previous noted U.S. patent application entitled, "Production of Dicobaltous Oxychromate and Percobaltous Oxychromates." The entire disclosure of this co-pending application is incorporated herein by reference. These three cobalt chromate compositions differ significantly from one another in their solubility characteristics.

Thus, for example, cobaltous chromate is generally considered to be insoluble in water at a pH of 7 at room temperature. It is presently considered that this compound in fact is soluble in water under these conditions in amounts of about 50 p.p.m. As opposed to this the dicobaltous oxychromate is considerably more soluble in water at this pH and temperature and is considered to go into solution by a decomposition type mechanism which provides in the solution cobalt and chromate ions and leaves a comparatively insoluble percobaltous oxychromate—cobaltous hydroxide residue. These solubilities are to be compared with the solubility of percobaltous oxychromate in water at a pH of 7 at room temperature. A particular percobaltous oxychromate composition is considered to go into solution to provide an aqueous solution containing less than 5 p.p.m. of the compound. These percobaltous oxychromates are considered to go into solution with a decomposition type mechanism similar to that encountered with the dicobaltous oxychromate.

The solubilities of these percobaltous oxychromates vary depending upon the pH of the solutions in which they are formed and/or their relative cobalt content. In general the more acidic the environment in which these oxychromates are formed the greater their solubility. The solubilities of all of these cobalt chromates in water change in accordance with both the temperature of the water and the pH of the water. In general the solubilities of various cobalt chromates and oxychromates as herein described vary as significantly in different liquid drying vehicles as they do in water.

In general it is considered that from about 0.5 to about 5% by weight of the weight of such a liquid drying vehicle in a coating composition should be a cobalt chromate compound as indicated in order to obtain a drying action. As subsequently indicated greater amounts can be employed in obtaining corrosion protection. Mixtures of these compounds can of course be employed to obtain only this drying action. Since the action of a dryer in connection with a drying oil or the like involves continuous variable factors and since the speed of drying to be obtained in a coating composition may change depending upon the application, considerable variation is possible in the amount of the cobalt chromate compound or mixture used.

In general the less the solubility of the compound or compounds used in the liquid drying vehicle in a coating composition the greater amount required to obtain a rapid drying action. This can be illustrated by referring to the action of dicobaltous oxychromate as a dryer for a conventional drying oil such as oiticica, tung, linseed and perilla oils. Comparatively small amounts of this chromate will cause these oils to set up as a gel-like mass comparatively rapidly. Such quantities of the dicobaltous oxychromate are greater than the quantities of the cobaltous chromate and percobaltous oxychromates which will achieve an effective drying action with these same oils.

The effectiveness of the dicobaltous oxychromate as a dryer for drying oils or the like can be effectively utilized so as to make possible the formulation of coating compositions such as paints in which semi-drying oils can be effectively used. This is considered to be of considerable commercial significance. Because of the slowness of their drying action these semi-drying oils have generally not been used in these compositions or have been used in them to only limited extents. As an example of this, an amount of the dicobaltous oxychromate as indicated in the preceding can be effectively utilized with semi-drying oils such as cotton seed, corn and soy bean oil as a dryer in a coating composition. Greater amounts of the dicobaltous oxychromate than are indicated can be utilized with such semi-drying oils in the preparation of linoleum-like products.

Although amounts of an inhibitor or inhibitor mixture within the indicated range of from 0.5 to 5% by weight will provide a degree of protection which is effective against galvanic corrosion by inhibiting such corrosion, it is normally preferred to utilize in coating compositions as herein described greater quantities of such an ingredient or mixture of ingredients when the coating compositions are to be utilized primarily in protecting against galvanic corrosion. The reasons for this pertain to a normal desire to utilize as much of an inhibitor or mixture as reasonably possible in order to insure the presence of an adequate amount of such an inhibitor or mixture to guard against any possibility of moisture present in the area of possible galvanic corrosion not contacting some of the inhibitor or mixture.

However, it is normally desired to limit the amount of an inhibitor or mixture used so that no economic waste occurs through the use of an excess of such an inhibitor or mixture over an amount necessary to provide effective protection against galvanic corrosion. For these reasons it is preferred that a coating composition as herein described contain from about 10 to about 20% by weight of one or more cobalt chromates as indicated in order to insure effective protection against galvanic corrosion without using an amount of such material which does not effectively increase the degree of protection achieved.

Such amounts of cobalt chromate are sufficiently high so as to be normally capable of setting up drying oils in a gel-like form in a coating composition prior to such a composition being applied in an intended manner. For this reason a preferred coating composition of the present invention should use a liquid film forming ingredient or ingredients as what are defined herein as semi-drying oils. This is particularly the case if dicobaltous oxychromate is used as the corrosion inhibitor.

It is considered preferable with the present invention to utilize as the corrosion inhibitor within such a coating composition a mixture of at least two of the cobalt chromates indicated. Such a mixture will not provide as rapid a drying action as the dicobaltous oxychromate alone. Because of the effectiveness of the dicobaltous oxychromate as a dryer, this use of several cobalt chromates is considered advantageous in avoiding the possibility of premature setting or gelling of a coating composition prior to its application. The use of such a mixture is also considered advantageous in creating a composition which is effective as a corrosion inhibitor over an extended period.

This is best explained by briefly referring to the action of a cobalt chromate as a galvanic corrosion inhibitor. For a compound to be effective as such an inhibitor it must be physically located where galvanic corrosion is expected or might occur. A compound of this type functions as such an inhibitor by passing into solution to at least a degree in the moisture present in an area where two dissimilar metals such as aluminum and iron are located. Generally because of the presence of the air containing carbon dioxide such moisture will be somewhat acidic. Under acidic conditions such cobalt chromates pass into the solutions more readily than under neutral or alkaline conditions.

As a result of using different cobalt chromates in a coating composition as described these chromates will pass into solution at different rates and thus at different time intervals as a protective coating from a composition as herein described is exposed to moisture. As a result of this, it is possible to attain in accordance with this invention protection which is more uniform over a prolonged period than would be obtained with a conventional single corrosion inhibitor by the use of a mixture of inhibitors as indicated. It is considered particularly effective results can be obtained by utilizing a mixture of approximately equal parts by weight of the dicobaltous oxychromate and percobaltous oxychromate since the solubilities of these compounds are significantly different.

It is common practice to utilize materials such as the inhibitors indicated in the preceding in the form of finely divided particles. In general, the more finely divided these particles the easier it is to mix them with other ingredients in a protective coating or similar composition. Also, in general the more finely divided particles of this type are in such a composition the greater their surface area. In order to promote an effective drying action in a liquid drying vehicle it is normally desired to increase the surface area of an inhibitor type composition or mixture as herein described to a great a degree as possible. This also tends to increase the surface area available for utilization in connection with such a compound or mixture serving as a corrosion inhibitor so as to achieve a maximum degree of effectiveness in protecting against galvanic corrosion.

For these reasons it is normally preferred that an inhibitor or mixture as herein described be utilized in a coating composition in the form of finely ground particles of at least —40 mesh standard Tyler screen size. Normally it is considered that preferred results are achieved using particles of at least —200 mesh standard Tyler screen size. However, for applications of inhibitors as herein indicated with liquid drying vehicles whch "dry" relatively rapidly such as drying oils and the more reactive semi-drying oils it may be necessary and/or desirable to utilize larger particles than are herein indicated in order to slow up the drying action received with this type of vehicle.

A coating composition of the present invention may contain other secondary ingredients such as are conventionally used in the manufacture of paints and related protective coatings. Thus, for example, they may contain various amounts of resins, plasticizers, and pigments. In connection with the latter it should be noted that the cobalt chromates used are in effect pigments. Thus, they may be used in place of other more conventional pigments in a coating composition. The properties of these various secondary ingredients which will be used in a coating composition of this invention will normally be varied by a manufacturer to suit availability of raw materials, in accordance with market application desires and the like.

In general such secondary ingredients may be employed in proportions in which they are commonly employed and present in coating compositions. A text indicating proportions of ingredients in various paints and other related coating compositions is the text The Chemical Formulary by Benett, Volume VI, copyright 1943, published by the Chemical Publishing, Inc., Brooklyn, N.Y. The tables as to various compositions of paints and enamels on pages 275 and 295 are incorporated herein by reference.

Although coating compositions falling within the scope of this invention may contain proportions of ingredients as indicated in the preceding discussion, it is considered that preferred results occur when the pigments and cobalt chromate ingredients of such a composition are used in proportions above the so-called "critical pigment" concentration. This term is used herein with reference to the pigment concentration in a final coating such as a paint film. It is used to designate a concentration at which there is a transistion between all of the pigment particles in such a film being coated with a drying oil or resin used in the coating composition and some of the pigment particles being uncoated. A coating composition is above the critical pigment concentration when in a final coating some of the pigment is exposed to the air. Conversely, a coating composition is below the critical pigment composition when in the final coating all of the pigment is covered by the drying oil or resin used.

It is considered that best results in inhibiting galvanic corrosion are achieved with the invention in a coating composition when the proportions of any cobalt chromate used and any additional pigment employed are above this critical pigment concentration and are preferably at least 10% by weight above this critical pigment concentration. The reasons for this pertain to the action of the cobalt chromate as in a corrosion inhibitor. When used in a coating composition, these inhibitors act by being contacted by moisture as indicated in the preceding discussion. When they are completely coated or covered as by a drying oil film, they are in effect isolated from significant quantities of ambient moisture. Hence, they cannot readily pass in solution even though some quantities of moisture will tend to pass through such a film.

It is not to be assumed from this that the coating composition of the present invention cannot be below the critical pigment concentration. Coating compositions of this invention which are below such concentration can be used to provide corrosion protection. For certain applications, compositions having concentrations below this critical figure may be preferred. Compositions of the invention which are below the critical pigment concentration will gradually expose any cobalt chromate in such a composition due to abrasion, weathering and the like so that such cobalt chromate will function as an inhibitor. Even within such a composition the cobalt chromate will to a degree function as a corrosion inhibitor because of gradual moisture penetration.

In order to facilitate an understanding of the present invention, the following specific examples are set forth. It is to be understood that these examples do not represent actual commercial compositions, but are based upon preliminary observations of compositions in accordance with this invention.

EXAMPLE I

It is considered that a coating composition useful in corrosion prevention can be prepared by mixing 5 parts by weight of dicobaltous oxychromate ground to $-325$ mesh with 95 parts by weight of a semi-drying oil such as soy bean oil having an iodine value of 124 to 133.

EXAMPLE 2

It is considered that a composition useful in corrosion prevention can be prepared by mixing 20 parts by weight of a mixture of ½ by weight dicobaltous oxychromate and ½ by weight of a percobaltous oxychromate formed by being precipitated at a pH of 8 as indicated in the aforenoted application entitled, "Production of Dicobaltous Oxychromate and Percobaltous Oxychromates," ground to $-325$ mesh size with 80 parts by weight of a semi-drying oil such as corn oil having an iodine value of 117 to 130.

EXAMPLE 4

It is considered that a coating composition useful in corrosion prevention can be prepared by mixing 10 parts by weight of a mixture of ½ by weight dicobaltous oxychromate and ½ by weight percobaltous oxychromate as in Example 3, 50 parts by weight zinc oxide and 35 parts by weight of soy bean oil having an iodine value of 124 to 133.

EXAMPLE 5

It is considered that a coating composition can be prepared by mixing 0.5 parts by weight dicobaltous oxychromate and the balance of a semi-drying oil such as soy bean oil having an iodine value of 124 to 133.

EXAMPLE 6

It is considered that a coating composition can be prepared by mixing 5 parts by weight of a mixture of ½ by weight dicobaltous oxychromate and ½ by weight percobaltous oxychromate as in Example 4 ground to $-200$ mesh size with 95 parts by weight of a semi-drying oil such as corn oil having an iodine value of 117 to 130.

EXAMPLE 7

It is considered that a composition useful in corrosion prevention can be prepared by mixing 20 parts by weight of cobaltous chromate ground to $-40$ mesh size with 80 parts by weight of a drying oil such as linseed oil having an iodine value of 170 to 185.

It will be recognized that these examples set forth compositions demonstrating the principles of the invention. Normally coating compositions utilizing this invention will be much more complex than indicated and will include various amounts of secondary ingredients. Frequently they will utilize mixtures of semi-drying oils or related alkyd resins. Such liquids capable of drying to form a film may be blended with or mixed with other ingredients used in commercial compositions in accordance with routine practice in the paint protective coating industry.

We claim:

1. A coating composition capable of use in inhibiting corrosion occuring as a result of galvanic coupling between two dissimilar metals, said coating composition including at least one liquid drying vehicle selected from the group consisting of drying oils, semi-drying oils and derivatives of these drying and semi-drying oils and their acids with synthetic resins, said coating composition also including a cobalt compound serving as a dryer for the liquid drying vehicle present, said dryer serving to promote the drying of said liquid drying vehicle to a solid substance, in which the improvement consists essentially of:
said cobalt dryer for said liquid drying vehicle consisting essentially of a cobalt chromate composition,
said cobalt chromate composition being present in said coating composition in an amount by weight effective as a dryer for the liquid drying vehicle present in said coating composition and in amount by weight effective as a corrosion inhibitor inhibiting corrosion occurring as a result of galvanic coupling between two dissimilar metals.

2. A coating composition as claimed in claim 1 wherein:
the amount of said dryer present within said coating composition is from about 0.5 to about 5% by weight of the weight of the liquid drying vehicle within said coating composition.

3. A coating composition as claimed in claim 1 wherein:
the amount of said dryer present within said coating composition is from about 10 to about 20% by weight of the weight of said coating composition.

4. A coating composition as claimed in claim 1 wherein:
said liquid drying vehicle is a semi-drying oil having an iodine value of no greater than 135.

5. A coating composition as claimed in claim 1 wherein:
said liquid drying vehicle is a drying oil having an iodine value in excess of 135.

6. A coating composition as claimed in claim 1 wherein:
said dryer is cobaltous chromate.

7. A coating composition as claimed in claim 1 wherein:
said dryer is dicobaltous oxychromate.

8. A coating composition as claimed in claim 1 wherein:
said dryer is a percobaltous oxychromate composition having the formula $x\text{CoO} \cdot \text{CrO}_3$ in which $x$ is greater than 2.

9. A coating composition as claimed in claim 1 wherein:
said dryer is a mixture of cobaltous chromates.

10. A coating composition as claimed in claim 1 wherein:
said dryer is a mixture of dicobaltous oxychromate and a percobaltous oxychromate composition having the formula $x\text{CoO} \cdot \text{CrO}_3$ in which $x$ is greater than 2.

11. In a composition which will "dry" to form a tough, elastic substance by absorption of oxygen and which has properties enabling it to be useful in protecting against galvanic corrosion a drying composition which consists essentially of:
a semi-drying oil having an iodine value no greater than 135 admixed with a cobalt chromate composition selected from the group consisting of cobaltous chromate, dicobaltous oxychromate and percobaltous oxychromates, having the formula $x\text{CoO} \cdot \text{CrO}_3$ in which $x$ is greater than 2,
said cobalt chromate composition being present in an amount by weight in said mixture which is effective to enable said cobalt chromate composition to serve as a dryer for the semi-drying oil in said mixture so that upon exposure to oxygen said semi-drying oil will absorb oxygen to form a tough, elastic substance.

12. A composition as claimed in claim 11 in which said cobalt chromate composition is dicobaltous oxychromate.

References Cited
UNITED STATES PATENTS 3,298,848   1/1967   Wachholz et al. ____ 106—264
2,573,738   11/1951  Smith et al. _____ 23—56 X

OTHER REFERENCES

Kirk-Othmer, Encyclopedia of Chemical Technology, 2nd ed., vol. 5, Interscience Publisher, New York, (64) p. 483.

JOSEPH L. SCHOFER, Primary Examiner

D. A. JACKSON, Assitant Examiner

U.S. Cl. X.R.

106—288, 302, 310; 148—6.2; 252—387